(12) United States Patent
Hausmann (10) Patent No.: US 12,492,785 B2
(45) Date of Patent: Dec. 9, 2025

(54) COMPRESSED GAS TANK AND METHOD FOR OPERATING A COMPRESSED GAS TANK

(71) Applicant: CELLCENTRIC GMBH & CO. KG, Kirchheim unter Teck (DE)

(72) Inventor: Philipp Hausmann, Kirchheim (DE)

(73) Assignee: CELLCENTRIC GMBH & CO. KG, Kirchheim unter Teck (DE)

( * ) Notice: Subject to any disclaimer, the term of this patent is extended or adjusted under 35 U.S.C. 154(b) by 532 days.

(21) Appl. No.: 18/003,464

(22) PCT Filed: Jun. 28, 2021

(86) PCT No.: PCT/EP2021/067703
§ 371 (c)(1),
(2) Date: Dec. 27, 2022

(87) PCT Pub. No.: WO2022/002853
PCT Pub. Date: Jan. 6, 2022

(65) Prior Publication Data
US 2023/0243475 A1 Aug. 3, 2023

(30) Foreign Application Priority Data
Jun. 29, 2020 (DE) .................... 10 2020 003 894.8

(51) Int. Cl.
*F17C 13/12* (2006.01)
*B01D 53/86* (2006.01)
(Continued)

(52) U.S. Cl.
CPC .......... *F17C 13/12* (2013.01); *B01D 53/8671* (2013.01); *B01J 19/002* (2013.01);
(Continued)

(58) Field of Classification Search
CPC .............. F17C 13/12; F17C 2205/0032; F17C 2270/0178; F17C 2270/0184;
(Continued)

(56) References Cited

U.S. PATENT DOCUMENTS 2,557,199 A 6/1951 Olson
7,008,219 B2 * 3/2006 Shimada ............. H01M 8/0606
431/170

FOREIGN PATENT DOCUMENTS

DE 10297661 4/2005
WO WO 2014/025446 2/2014

OTHER PUBLICATIONS

International Search Report and Written Opinion for International (PCT) Patent Application No. PCT/EP2021/067703, dated Oct. 18, 2021, 10 pages.

* cited by examiner

Primary Examiner — Lessanework Seifu
(74) Attorney, Agent, or Firm — Sheridan Ross P.C.

(57) ABSTRACT

The invention relates to a compressed gas storage tank, in particular for a motor vehicle, with a holder that is designed to store a compressed fuel, and with at least one pressure relief valve. Fuel is dischargeable from the holder into environment of the compressed gas tank due to the opening of at least one pressure relief valve. A catalytic converter device of the compressed gas storage tank is designed to catalyze an oxidation reaction of fuel originating from the holder with oxygen. The compressed gas storage tank has at least one piezoelectric element to which a pressure can be applied by opening the at least one pressure relief valve. Through the pressure, at least one spark can be generated by means of the at least one piezoelectric element. The inven-
(Continued)

tion furthermore relates to a method for operating a compressed gas storage tank of said type.

20 Claims, 3 Drawing Sheets

(51) Int. Cl.
*B01J 19/00* (2006.01)
*F17C 13/04* (2006.01)
(52) U.S. Cl.
CPC ........ *F17C 13/04* (2013.01); *B01D 2251/102* (2013.01); *B01D 2257/108* (2013.01); *B01D 2258/02* (2013.01); *B01D 2259/4566* (2013.01); *B01J 2219/0027* (2013.01); *F17C 2205/0332* (2013.01); *F17C 2221/012* (2013.01); *F17C 2221/033* (2013.01); *F17C 2221/035* (2013.01); *F17C 2223/0161* (2013.01); *F17C 2270/0178* (2013.01); *F17C 2270/0184* (2013.01)
(58) Field of Classification Search
CPC ......... F17C 2265/031; F17C 2265/066; B01D 53/8671; B01J 19/002; Y02E 60/32
See application file for complete search history.

COMPRESSED GAS TANK AND METHOD FOR OPERATING A COMPRESSED GAS TANK

CROSS REFERENCE TO RELATED APPLICATIONS

This application is a national stage application under 35 U.S.C. 371 and claims the benefit of PCT Application No. PCT/EP2021/067703 having an international filing date of 28 Jun. 2021, which designated the United States, and which PCT application claimed the benefit of German Patent Application No. 10 2020 003 894.8 filed 29 Jun. 2020, the contents of each of which are incorporated herein by reference in their entireties.

The invention relates to a compressed gas storage tank with a holder, which is designed for storing a compressed fuel, and with at least one pressure relief valve. Due to an opening of the at least one pressure relief valve, fuel can be discharged from the holder into an environment of the compressed gas storage tank. A catalytic converter device of the compressed gas storage tank is designed to catalyze an oxidation reaction of fuel originating from the holder with oxygen. Furthermore, the invention relates to a method for operating such a compressed gas storage tank.

Pressurized gas storage tanks, such as those used as cryogenic fuel storage tanks for automotive applications, are confronted with the challenge that gaseous fuel must be discharged into the environment of the pressurized gas storage tank in the event of a heat input from outside when the vehicle is at a standstill, i.e. without fuel from the tank being used to provide energy for moving the vehicle. If cryogenic or cryogenic fuel stored in liquid form is discharged in gaseous form to the outside or to the environment, the associated losses of fuel are also referred to as boil-off losses. The discharge of gaseous fuel into the environment via a pressure relief valve, which opens automatically when the pressure in the vessel exceeds a threshold value, serves to relieve the pressure in the vessel in which the compressed fuel is stored.

Typically, such depressurization occurs when using liquefied hydrogen as a compressed fuel at pressures of less than 10 bar and, in particular, about 6 bar. The gas discharged into the environment represents an energy carrier, so that the potential hazards associated with the release of such an energy carrier should be avoided. In particular, it is important to avoid releasing gaseous hydrogen into a closed environment, such as that present in a parking garage, garage, workshop, hall, underground or the like.

Against this background, methods exist to catalytically burn fuel released from the holder of a compressed gas storage tank and then to discharge the products of such an oxidation reaction of the fuel with oxygen into the environment.

For example, DE 102 97 661 T5 describes catalytic combustion of outlet gases, i.e. of gas leaving a pressure vessel. Here, a pressure relief valve is arranged on a pressure vessel, from which a pipe leads to a catalytic reactor. In the catalytic reactor, the gas reacts with atmospheric oxygen to form water in the case of hydrogen. The catalytic reactor has a first chamber in which a catalytic burner is arranged to which the gas and air are supplied. A spark plug projects into a second chamber of the catalytic reactor, which is separated from this chamber by a screen. The spark plug is used to ignite combustible gas which, without having reacted in the catalytic burner, passes through the screen into the second chamber. The ignition device in the form of the spark plug is used in particular at the start of catalytic combustion to bring the catalytic burner to its start-up temperature by means of the flame formed by ignition of the spark plug.

With regard to the safety to be ensured, the generation of a burning flame in a chamber of the catalytic reactor is at least demanding in terms of the design or operation of the reactor. Because in the adjacent pressure vessel and in the catalytic reactor itself, flammable gas is present.

In addition, reliable ignition of the spark plug must ensure that no combustible gas escapes from the catalytic reactor into the environment. This, too, is associated with a corresponding effort.

It is therefore the object o the present invention to provide a compressed gas storage tank of the type mentioned above, in which a particularly reliable and safe oxidation of the fuel originating from the holder can be achieved, and to specify a corresponding method for operating a compressed gas storage tank. This object is solved by a compressed gas storage tank with the features of claim 1 and by a method with the features of claim 10. Advantageous embodiments with expedient further developments of the invention are indicated in the dependent claims.

The compressed gas storage tank according to the invention, which can be provided in particular for use in a motor vehicle, comprises a holder which is designed for storing a compressed fuel. The compressed gas storage tank has at least one pressure relief valve, wherein it is possible for fuel to be discharged from the holder into an environment of the compressed gas storage tank as a result of the opening of the at least one pressure relief valve. A catalytic converter device of the compressed gas storage tank is designed to catalyze an oxidation reaction of fuel originating from the holder with oxygen. The compressed gas storage tank has at least one piezoelectric element to which a pressure can be applied by opening the at least one pressure relief valve. The pressure can cause at least one spark to be generated by means of the at least one piezoelectric element.

In other words, applying the pressure to the at least one piezoelectric element causes the at least one spark to be generated by means of the at least one piezoelectric element. Consequently, the at least one piezoelectric element acts in the manner of a tinder which is actuated by the pressure causing the at least one pressure relief valve to open. By providing the at least one spark, ignition energy is provided for the start of the oxidation reaction of the fuel with the oxygen. The onset of the exothermic oxidation reaction of the fuel with the oxygen then provides for the conversion of further fuel molecules with oxygen in the manner of a chain reaction. In this way, the catalytic converter device can also be brought to a start-up temperature at which the catalytic conversion of the fuel with the oxygen takes place by oxidation in the form of cold combustion.

Since the pressure applied when the at least one pressure relief valve opens also pressurizes the at least one piezoelectric element, the at least one spark is provided particularly safely and reliably. Consequently, a reliable and safe oxidation of the fuel coming from the holder is also achievable.

When the at least one pressure relief valve is opened, the at least one piezoelectric element is actuated at the same time and thus the ignition energy in the form of the at least one spark is provided by the piezoelectric element serving as ignition device.

Losses of fuel originating from the holder can thus be safely converted into low-energy products or media by a passive and intrinsically safe device comprising the at least one piezoelectric element.

This significantly increases the passive safety of the compressed gas storage tank. This applies in particular if the holder of the compressed gas storage tank is used as a cryogenic fuel storage tank in the motor vehicle. A motor vehicle with such a compressed gas storage tank can then be parked in an enclosed area such as a closed hall, a house, a parking garage, a garage, a workshop or the like, as long as there is sufficient oxygen in the ambient air for the oxidation reaction in which the oxygen reacts with the fuel originating from the holder.

The holder can be designed in particular for storing compressed fuel in the form of liquid hydrogen ($LH_2$) or cryo-compressed hydrogen ($CcCH_2$), but also in the form of compressed hydrogen ($CH_2$). In this case, conversion of the fuel into water vapor ($H_2O$) takes place during cold combustion in the form of the catalytic oxidation reaction of hydrogen with oxygen.

If the compressed fuel is liquefied petroleum gas (LPG) or liquefied natural gas (LNG), other products such as $CO_2$ and/or nitrogen oxides may also be formed during the oxidation reaction with oxygen. The same applies to the use of compressed natural gas (CNG) as the compressed fuel.

Preferably, the at least one piezoelectric element is arranged between a valve disk of the at least one pressure relief valve and a padding device for a spring element of the at least one pressure relief valve. In this case, the at least one piezoelectric element can be pressurized by moving the valve disk away from a valve seat of the at least one pressure relief valve. By integrating the at least one piezoelectric element in the pressure relief valve in this way, it can be achieved with particular certainty that each opening of the pressure relief valve also leads to the generation of the at least one spark by means of the piezoelectric element. In addition, the closing force of the pressure relief valve can ensure that when the pressure relief valve is opened, the at least one piezoelectric element is compressed in such a way that the at least one piezoelectric element acts as a piezoelectric ignition generator. This ensures reliable provision of the ignition energy for the start of the oxidation reaction of the fuel with the oxygen.

In particular, the spring element of the at least one pressure relief valve can be formed by the at least one piezoelectric element. In this case, the ignition device in the form of the at least one piezoelectric element also functions as the closing device of the pressure relief valve. The closing device determines the pressure threshold at which the at least one pressure relief valve opens. When the threshold value is exceeded, the pressure relief valve not only opens, but the piezoelectric element is also subjected to pressure, in particular the at least one piezoelectric element is compressed. With this design, it can be achieved particularly reliably that the opening of the pressure relief valve simultaneously leads to the generation of the at least one spark by means of the piezoelectric element or piezoelectric tinder. In addition, such a design of the pressure relief valve requires little effort, since a separate spring element does not need to be provided in addition to the piezoelectric element.

It can be provided that the compressed gas storage tank has only one pressure relief valve, and that by opening this one pressure relief valve the at least one piezoelectric element is pressurized. In this way, a particularly low-cost compressed gas storage tank is provided.

Alternatively, it can be provided that the compressed gas storage tank has a first pressure relief valve and a second pressure relief valve. In this case, the second pressure relief valve is arranged downstream of the first pressure relief valve, as seen in the direction of flow of the fuel exiting the holder. Furthermore, the at least one piezoelectric element can be pressurized by opening the second pressure relief valve. In this way, it is particularly safe to prevent energy released as a result of the generation of the at least one spark from being introduced into the interior of the holder. Consequently, a particularly high level of safety can be achieved. This applies in particular if the first pressure relief valve opens at a higher pressure than the second pressure relief valve.

Preferably, a valve device is arranged between the first pressure relief valve and the second pressure relief valve to prevent fuel from flowing back to the holder. This is also conducive to increased safety, since the entry of thermal energy released during the exothermic oxidation reaction of fuel with oxygen into the interior of the holder is prevented to a particularly large extent.

It is particularly easy to provide the valve device that impedes the backflow if it is designed as a passive valve device that has a current resistance that is lower in the flow direction than in a flow direction opposite to the flow direction. Such a passive valve device can be designed in particular as a Tesla valve. In such a valve device, in particular in the form of the Tesla valve, the shaping of flow channels within the valve device ensure the preferred flow direction in the flow direction compared to flow in the opposite flow direction.

Preferably, the compressed gas storage tank has an outlet device through which products of the oxidation reaction of the fuel can be discharged into the environment of the compressed gas storage tank. This enables a controlled discharge of the products formed during the oxidation of the fuel with the oxygen.

In addition or alternatively, the outlet device can be designed as a section of an exhaust gas tract of the motor vehicle. In particular, if the fuel from the holder of the compressed gas storage tank is to be supplied to an internal combustion engine of the motor vehicle, an exhaust gas tract is present anyway, through which exhaust gases from the internal combustion engine can be discharged. Accordingly, it makes sense to use a section of the exhaust gas tract as the outlet device of the compressed gas storage tank.

In such a section of the exhaust tract, so-called secondary air can be introduced into the exhaust gas by means of a corresponding device downstream of the internal combustion engine in order to provide the oxygen for the oxidation reaction. Additionally or alternatively, valve control of the internal combustion engine can be carried out in such a way that air can be supplied to the fuel to be oxidized via an at least partially open intake valve and an at the same time at least partially open outlet valve. In this case, at least one combustion chamber of the internal combustion engine, to which the inlet valve and the outlet valve are associated serve as the air inlet of the outlet device, and no means for providing secondary air need be provided.

Even if products of the oxidation reaction of the fuel are to be discharged into the environment of the compressed gas storage tank via the outlet device, which is not designed as part of an exhaust gas train, the compressed gas storage tank preferably has an air inlet. In this way, a defined air supply to the fuel in the region of the at least one piezoelectric element and/or in the region of the catalytic converter device can be ensured.

Preferably, the catalytic converter device is arranged in a section of the outlet device. In this way, by means of an appropriate air supply to the catalytic converter device, it is possible to ensure that the oxidation reaction can take place, catalyzed by the catalytic converter device, in which the fuel coming from the holder reacts with oxygen in a cold combustion.

It has been shown to be further advantageous if the outlet device has a sonic vaporizer. This is because the products formed during the oxidation reaction of oxygen and fuel are then discharged into the environment with particularly low noise during operation of the compressed gas storage tank.

Preferably, the outlet device is aligned essentially vertically in the installation position of the compressed gas storage tank. In this way, the stack effect that occurs when the fuel reacts with the oxygen in the oxidation reaction can be used particularly advantageously to discharge the products of the oxidation reaction into the environment of the compressed gas storage tank. However, the vertical orientation of the outlet device is also useful with regard to the fact that water formed during the oxidation reaction can easily and reliably drain out of the outlet device. This is particularly advantageous because in this way restrictions on the flow through the outlet device due to ice formation are avoided to a particularly large extent.

In particular, the vertically oriented outlet device can have a shape similar to that of a blast furnace, in which a shaft-shaped section of the outlet device is designed in the manner of an elongated truncated cone. However, other shapes are also advantageous, which in particular can be accompanied by a tapering of the outlet device towards an outlet.

Preferably, the outlet device tapers towards an outlet. Such a shape makes it particularly easy to ensure that products formed during the exothermic oxidation reaction are reliably discharged into the environment. This is because such an outlet device has a shape that is particularly favorable to flow.

Additionally or alternatively, the outlet device can have a cover at the end. Such a cover reliably prevents unwanted substances, in particular water, from entering the outlet device, so that a good flow through the outlet device is ensured.

The air inlet of the outlet device can have a non-return valve. This ensures that no flames escape from the outlet device into the environment via the air inlet.

For this purpose, the air inlet can additionally or alternatively have a valve device with a current resistance which is lower in a first flow direction than in a second flow direction opposite to the first flow direction. In particular, the valve device can thus be designed as a passive valve device, for example in the manner of a Tesla valve.

Preferably, at least one electrode of the at least one piezoelectric element has a coating with a catalyst material. The catalyst material is designed to catalyze an oxidation reaction of the fuel originating from the holder with oxygen. In this way, the reaction of fuel with oxygen can already be catalyzed at the piezoelectric element itself. In this way, a particularly extensive conversion of the fuel with the oxygen in the oxidation reaction is made possible.

Finally, it has been shown to be advantageous if the compressed gas storage tank has at least two piezoelectric elements to which the pressure can be applied. Even in the event of a malfunction of one of the piezoelectric elements, the at least one other piezoelectric element can therefore provide or generate the at least one spark due to the application of the pressure. This is also conducive to the reliability and safety of the oxidation of the fuel.

In the method according to the invention for operating a compressed gas storage tank, which can be used in particular in a motor vehicle, a compressed fuel is stored in a holder of the compressed gas storage tank. Due to an opening of at least one pressure relief valve of the compressed gas storage tank, fuel is discharged from the holder into an environment of the compressed gas storage tank. An oxidation reaction is catalyzed by means of a catalytic converter device of the compressed gas storage tank, in which fuel originating from the holder reacts with oxygen. The compressed gas storage tank has at least one piezoelectric element to which a pressure is applied by opening the at least one pressure relief valve. Due to the pressurization of the at least one piezoelectric element, at least one spark is generated by the at least one piezoelectric element.

The at least one spark provides ignition energy for triggering the oxidation reaction of the fuel with the oxygen. A reaction of the fuel with the oxygen thus takes place. In this way, it can be particularly reliably prevented that fuel in a form not yet oxidized by oxygen reaches the environment. Consequently, a particularly reliable and safe oxidation, in particular catalyzed by means of the catalytic converter device, of the fuel coming from the holder is achieved.

The advantages and preferred embodiments described for the compressed gas storage tank according to the invention also apply to the method according to the invention and vice versa.

Further advantages, features and details of the invention will be apparent from the following description of exemplary embodiments and from the drawings. The features and combinations of features mentioned above in the description, as well as the features and combinations of features mentioned below in the figure description and/or shown alone in the figures, can be used not only in the combination indicated in each case, but also in other combinations or on their own, without departing from the scope of the invention. Showing:

In the figures the same or functionally identical elements are marked with the same reference numbers.

Figure 1:
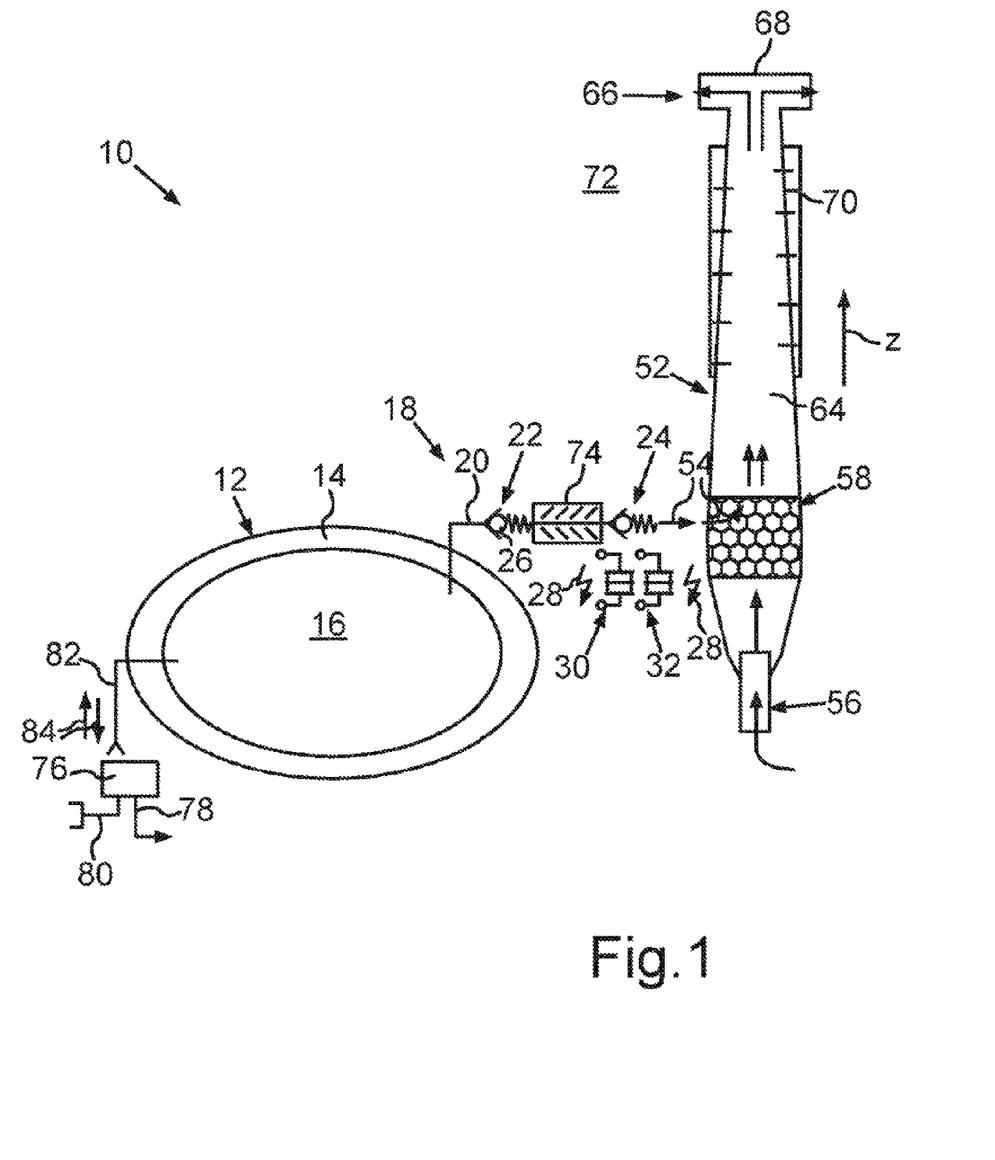
FIG. 1 schematically a compressed gas storage tank of a motor vehicle in which, in the event of gaseous fuel being discharged from a holder of the compressed gas storage tank, at least one piezoelectric element is actuated, resulting in the formation of sparks.

A compressed gas storage tank 10 shown in highly schematized form in FIG. 1 comprises a holder 12, which has a thermally insulating holder wall 14. The holder wall 14 surrounds a receiving chamber 16 of the holder 12, in which compressed fuel can be stored. For the purposes of the present example, it can be assumed that liquid hydrogen is stored in the receiving chamber 16 surrounded circumferentially by the holder wall 14. Accordingly, the fuel in the form of the liquid hydrogen may have a density of 80 grams per liter and may be stored in the receiving chamber 16 at a temperature of, for example, −253 degrees Celsius.

Due to the fuel being exposed to heat, for example as a result of heat radiation and/or heat conduction and/or convection, liquid hydrogen may evaporate and gaseous hydrogen may subsequently have to be removed from the holder 12 in order to prevent the mechanical pressure load on the holder wall 14 from becoming too great.

For this purpose, the compressed gas storage tank 10 has a pressure relief device 18 which, according to the schematic representation in FIG. 1, comprises a line 20 opening into the receiving chamber 16. A section of the line 20 is shown schematically in FIG. 3. A first pressure relief valve 22 and a second pressure relief valve 24 are arranged in the line 20. As seen in the direction of flow of gaseous fuel out of the receiving chamber 16 and accordingly as seen in the direction of flow of the gaseous fuel through the line 20, the second pressure relief valve 24 is arranged downstream of the first pressure relief valve 22. Accordingly, the second pressure relief valve 24 is connected in series with the first pressure relief valve 22. Both the first pressure relief valve 22 and the second pressure relief valve 24 open when a threshold value of a predetermined pressure is exceeded.

For example, the first pressure relief valve 22 may open when the pressure acting on a closure member 26 of the first pressure relief valve 22 exceeds a value of about 6 bar. Similarly, the second pressure relief valve 24 may open, for example, when the pressure exceeds a threshold value of about 5 bar.

Figure 3:
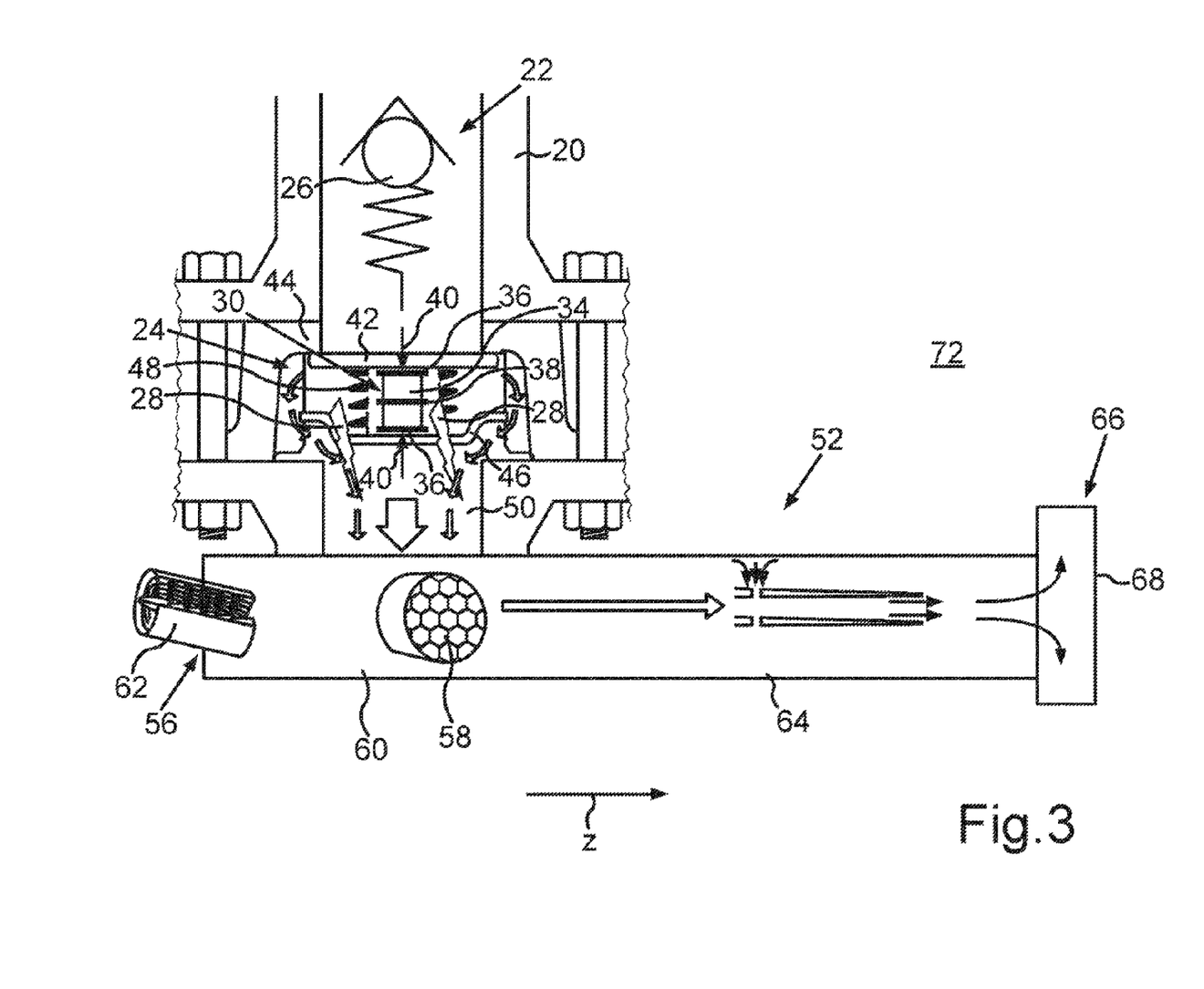
FIG. 3 schematically and in a partially enlarged view a possibility of actuating the at least one piezoelectric element when opening one of the pressure relief valves.

Here, the opening of the second pressure relief valve 24 causes the generation of at least one spark 28, which is shown schematically in FIG. 1 and in FIG. 3. The at least one spark 28 is generated by compressing at least one piezoelectric element 30, 32, wherein two piezoelectric elements 30, 32 are shown schematically arranged next to each other in FIG. 1 as an example.

Figure 2:
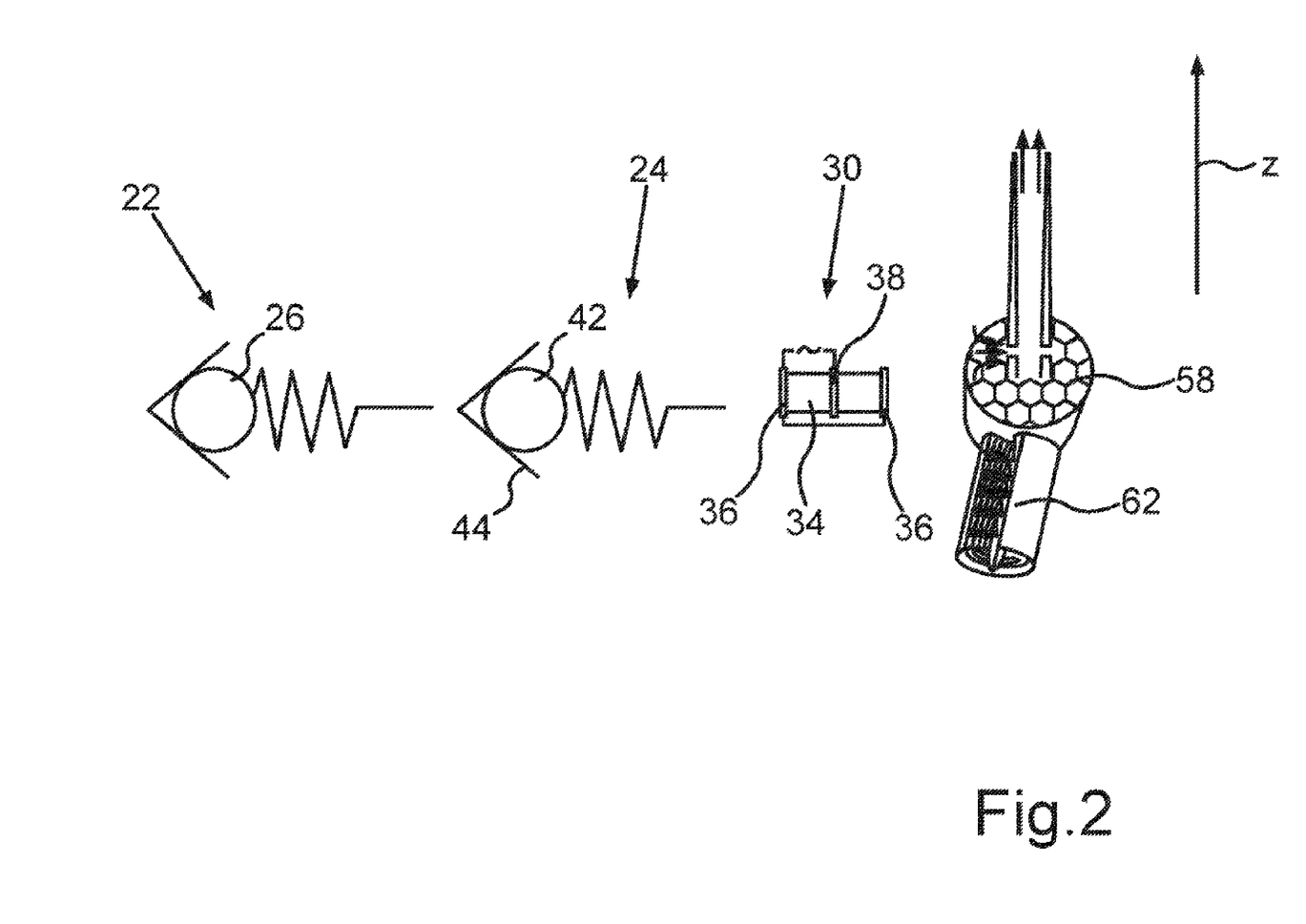
FIG. 2 schematically the arrangement of two pressure relief valves in the area of a pressure relief device of the compressed gas storage tank.

From FIG. 2, the actuation of the at least one piezoelectric element 30, 32 due to the opening of the second pressure relief valve 24 is more apparent. However, only one of the two piezoelectric elements 30, 32 is shown in FIG. 2 for the sake of clarity. When both piezoelectric elements 30, 32 are actuated simultaneously, each of the piezoelectric elements releases sparks 28. Therefore, the provision of two ignition devices arranged side by side in the form of the two piezoelectric elements 30, 32 is advantageous.

To illustrate the conversion of gaseous fuel exiting the receiving chamber 16 into low-energy or oxidized products, the process of actuating only one of the piezoelectric elements 30, 32 is explained below by way of example. However, the actuation of the other of the two piezoelectric elements 30, 32 is carried out analogously.

Referring to FIG. 2, the piezoelectric element 30 may comprise, in a manner known per se, approximately one crystal 34 and a plurality of electrodes 36, 38. Between the outer electrodes 36 and the central electrode 38, as a result of an application of pressure to the crystal 34 and an associated elastic deformation of the crystal 34, a spark over can occur or the sparks 28 can be generated. The corresponding pressure forces moving the two outer electrodes 36 toward each other are illustrated in FIG. 3 by respective arrows 40.

According to FIG. 2, the opening of the second pressure relief valve 24 simultaneously ensures the pressurization of the piezoelectric element 30 and thereby the generation of the at least one spark 28. In particular, the closing force of the second pressure relief valve 24 can be set in such a way that, when the second pressure relief valve 24 is opened, the at least one piezoelectric element 30, 32 acts as a ignition generator, which leads to the generation of the at least one spark 28. The ignition device in the form of the at least one piezoelectric element 30, 32 is thus preferably actuated when the second pressure relief valve 24 is opened.

FIG. 3 illustrates an exemplary embodiment of an integration of the at least one piezoelectric element 30 into the second pressure relief valve 24. Accordingly, the second pressure relief valve 24 has a movable closing body in the form of a valve disk 42, which rests against a valve seat 44 of the pressure relief valve 24 when the pressure relief valve 24 is closed. The piezoelectric element 30 is arranged between the valve disk 42 and a padding device 46, on which a spring element 48 of the pressure relief valve 24 is padded.

The spring element 48, which compresses against the padding device 46, presses the valve disc 42 against the valve seat 44. Thus, when the spring element 48 is compressed, the valve disc 42 is moved away from the valve seat 44 so that the gaseous fuel can escape. In this case, the movement of the valve disc 42 toward the padding device 46 also causes the piezoelectric element 30 to be compressed, as illustrated by the arrows 40 in FIG. 3.

It can also be provided that the spring element 48 of the second pressure relief valve 24 is formed by the at least one piezoelectric element 30, 32. In this case, the spring element 48 does not need to be provided in addition to the at least one piezoelectric element 30, 32. Accordingly, in this particularly low-component variant, the threshold value of the pressure at which the second pressure relief valve 24 opens is predetermined by the at least one piezoelectric element 30, 32. The gas volume trapped between the two pressure relief valves 22, 24 after the opening of the first pressure relief valve 22 and before the opening of the second pressure relief valve 24 now escapes, i.e. after closing of the first pressure relief valve 22 arranged on the tank side and with the second pressure relief valve 24 open at the same time, via a mouth 50 (not shown in FIG. 1 and FIG. 2) into a chimney-shaped outlet device 52. The corresponding flow path of the gaseous fuel through the mouth 50 of the line 20 is illustrated in FIG. 1 by arrows 54.

When the at least one piezoelectric element 30, 32 is compressed, the sparks 28 are generated. In addition, oxygen is present in the region of the mouth 50, i.e. the connection point of the line 20 to the outlet device 52, which is designed in the manner of a chimney in the present case. This is because the outlet device 52 has an air inlet 56. The at least one spark 28 now provides the ignition energy for the start of an oxidation reaction of the gaseous fuel, in this case hydrogen, with oxygen from the air. The exothermic oxidation reaction ensures that other fuel molecules also react with oxygen molecules.

In particular, this causes heating of a catalytic converter device 58, which in the present case is arranged in a lower section 60 of the outlet device 52. At a catalyst material of the catalytic converter device 58, the conversion of the fuel into oxidation products of the fuel molecules takes place at low ambient temperature. For example, temperatures of 60 degrees Celsius to 80 degrees Celsius may be encountered during the conversion of the hydrogen with oxygen, and thus cold combustion of hydrogen with oxygen may be achieved. Accordingly, the hydrogen is converted to water or water vapor during the oxidation reaction with oxygen catalyzed by the catalytic converter device 58.

Accordingly, if the fuel from the holder 12 is, for example, compressed or liquid natural gas, other oxidation products such as carbon dioxide and nitrogen oxides will also occur. Again, however, cold combustion of the fuel takes place in the catalytic converter device 58, and thus conversion to low-energy and no longer reactive media takes place.

From FIG. 2 and from FIG. 3 it can be seen that the air inlet 56 can have a preferably passive valve 62 which permits a largely unimpeded inflow of air into the outlet device 52 and thus towards the catalytic converter device 58, but prevents air from escaping via the air inlet 56 as far as possible.

For example, the valve 62 can be designed as a non-return valve or as a Tesla valve, in which the flow resistance in one flow direction is lower than in the opposite flow direction. Such a Tesla valve is shown schematically and partially cut in FIG. 2 and FIG. 3 in the area of the air inlet 56 of the chimney-type outlet device 52.

In particular, it can be seen from FIG. 1 that the outlet device 52 preferably extends vertically. Accordingly, an upward direction z of the outlet device 52 in the installation position of the compressed gas storage tank 10 in the motor vehicle is preferably aligned parallel to the vehicle vertical axis. In this way, in particular in a section 64 of the outlet device 52 formed downstream of the catalytic converter device 58, a stack effect can occur during operation of the pressure relief device 18. The fuel can thus be introduced into the outlet device 52, which has a particularly streamlined shape, via the mouth 50 of the second pressure relief valve 24 through which the fuel passes and which has the integrated at least one piezoelectric element 30, 32 or piezoelectric tinder.

For example, the outlet device 52 may be in the form of a blast furnace in which the section 64 adjoining the catalytic converter device 58 tapers towards an outlet 66 of the outlet device 52. In the region of the outlet 66, the outlet device 52 may have an end cover 68.

Accordingly, the products formed during the oxidation reaction cannot pass upwardly through the cover 68, but are deflected at the cover 68 and exit laterally from the outlet device 52.

Furthermore, a sonic vaporizer 70 may be arranged or formed in particular in this section 64 of the outlet device 52. As a result, particularly low acoustic emissions occur during the cold combustion of the fuel at the catalytic converter device 58 and the removal of the products of the oxidation reaction into an environment 72 of the compressed gas storage tank 10.

In the present case, the pressures build up again when the gaseous fuel is discharged via the pressure relief device 18 as soon as the permissible pressure is again exceeded in the receiving chamber 16 of the holder 12. With each opening of the at least one pressure relief valve 22, 24, the ignition device in the form of the at least one piezoelectric element 30, 32 is also actuated again, so that the sparks 28 are generated or produced again. During operation of the compressed gas storage tank 10, cold combustion of the gaseous fuel thus also occurs intermittently before it reaches the environment 72 of the compressed gas storage tank 10 via the outlet device 52.

FIG. 1 further shows that a valve 74 can be arranged in the line 20 of the pressure relief device 18 between the first pressure relief valve 22 and the second pressure relief valve 24, which is preferably also designed, for example, as a Tesla valve. Such a passive valve 74 prevents a backflow of fuel or hydrogen to the first pressure relief valve. 22.

Furthermore, it is shown schematically in FIG. 1 that a further valve device 76 can be arranged on the holder 12, via which a removal of fuel from the receiving chamber 16 and an introduction of fuel into the receiving chamber 16 can take place. Accordingly, the valve device 76 has an outlet 78 via which the fuel can be supplied from the receiving chamber 16 to, for example, a fuel cell stack and/or an internal combustion engine of the motor vehicle.

Further, the valve device 76 may serve to shut off a filler neck 80 of the compressed gas storage tank 10. Via the filler neck 80, fuel can be introduced into the receiving chamber 16 during refueling of the holder 12. Over at least one line 82 shown schematically in FIG. 1, the tank fitting in the form of the valve device 76 can be in communication with the receiving chamber 16 of the holder 12. Corresponding arrows 84 illustrate in FIG. 1 the introduction of fuel into the receiving chamber 16 during refueling and the removal of fuel during operation.

LIST OF REFERENCE NUMBERS

10 Compressed gas storage tank
12 Holder
14 Holder wall
16 Receiving chamber
18 Pressure relief device
20 Line
22 Pressure relief valve
24 Pressure relief valve
26 Closing body
28 Spark
30 Piezoelectric element
32 Piezoelectric element
34 Crystal
36 Electrode
38 Electrode
40 Arrow
42 Valve disk
44 Valve seat
46 Padding device
48 Spring element
50 Mouth
52 Outlet device
54 Arrow
56 Air inlet
58 Catalytic converter device
60 Section
62 Valve I
64 Section
66 Outlet
68 Cover
70 Sonic vaporizer
72 Environment
74 Valve I
76 Valve device
78 Output
80 Filler neck
82 Line
84 Arrow
z Upward direction

The invention claimed is:

1. A compressed gas storage tank, in particular for a motor vehicle, with a holder which is designed to store a compressed fuel, with at least one pressure relief valve, wherein due to opening of the at least one pressure relief valve, fuel is dischargeable from the holder into an environment of the compressed gas storage tank, and with a catalytic converter device which is designed to catalyze an oxidation reaction of fuel originating from the holder (12) with oxygen, characterized in that the compressed gas storage tank has at least one piezoelectric element to which a pressure can be applied by opening the at least one pressure relief valve, wherein the pressure can cause at least one spark to be generated by means of the at least one piezoelectric element.

2. The compressed gas storage tank according to claim 1, wherein the at least one piezoelectric element is arranged between a valve disc of the at least one pressure relief valve and a padding device for a spring element of the at least one pressure relief valve, wherein, the at least one piezoelectric element can be subjected to the pressure by moving the valve disk away from a valve seat of the at least one pressure relief valve.

3. The compressed gas storage tank according to claim 2, wherein
the spring element of the at least one pressure relief valve is formed by the at least one piezoelectric element.

4. The compressed gas storage tank according to claim 2, wherein the compressed gas storage tank has a first pressure relief valve and a second pressure relief valve, wherein the second pressure relief valve is arranged downstream of the first pressure relief valve, as seen in the direction of flow of the fuel emerging from the holder, and whereby it is possible for the at least one piezoelectric element to be subjected to the pressure by the opening of the second pressure relief valve.

5. The compressed gas storage tank according to claim 2, wherein the compressed gas storage tank has an outlet device, in particular comprising an air inlet, through which products of the oxidation reaction of the fuel can be discharged into the environment of the compressed gas storage tank, and/or which is designed as a section of an exhaust gas tract of the motor vehicle.

6. The compressed gas storage tank according to claim 2, wherein at least one electrode of the at least one piezoelectric element has a coating with a catalyst material which is designed to catalyze an oxidation reaction of the fuel originating from the holder with oxygen and/or the compressed gas storage tank has at least two piezoelectric elements to which the pressure can be applied.

7. The compressed gas storage tank according to claim 3, wherein the compressed gas storage tank has a first pressure relief valve and a second pressure relief valve, wherein the second pressure relief valve is arranged downstream of the first pressure relief valve, as seen in the direction of flow of the fuel emerging from the holder, and whereby it is possible for the at least one piezoelectric element to be subjected to the pressure by the opening of the second pressure relief valve.

8. The compressed gas storage tank according to claim 3, wherein the compressed gas storage tank has an outlet device, in particular comprising an air inlet, through which products of the oxidation reaction of the fuel can be discharged into the environment of the compressed gas storage tank, and/or which is designed as a section of an exhaust gas tract of the motor vehicle.

9. The compressed gas storage tank according to claim 3, wherein at least one electrode of the at least one piezoelectric element has a coating with a catalyst material which is designed to catalyze an oxidation reaction of the fuel originating from the holder with oxygen and/or the compressed gas storage tank has at least two piezoelectric elements to which the pressure can be applied.

10. The compressed gas storage tank according to claim 1, wherein
the compressed gas storage tank has a first pressure relief valve and a second pressure relief valve, wherein the second pressure relief valve is arranged downstream of the first pressure relief valve, as seen in the direction of flow of the fuel emerging from the holder, and whereby it is possible for the at least one piezoelectric element to be subjected to the pressure by the opening of the second pressure relief valve.

11. The compressed gas storage tank according to claim 10, between the first pressure relief valve and the second pressure relief valve a valve device is arranged which impedes a backflow of fuel towards the holder, in particular a valve device which has a flow resistance which is lower in the flow direction than in a flow direction opposite to the flow direction.

12. The compressed gas storage tank according to claim 10, wherein the compressed gas storage tank has an outlet device, in particular comprising an air inlet, through which products of the oxidation reaction of the fuel can be discharged into the environment of the compressed gas storage tank, and/or which is designed as a section of an exhaust gas tract of the motor vehicle.

13. The compressed gas storage tank according to claim 10, wherein at least one electrode of the at least one piezoelectric element has a coating with a catalyst material which is designed to catalyze an oxidation reaction of the fuel originating from the holder with oxygen and/or the compressed gas storage tank has at least two piezoelectric elements to which the pressure can be applied.

14. The compressed gas storage tank according to claim 11, wherein the compressed gas storage tank has an outlet device, in particular comprising an air inlet, through which products of the oxidation reaction of the fuel can be discharged into the environment of the compressed gas storage tank, and/or which is designed as a section of an exhaust gas tract of the motor vehicle.

15. The compressed gas storage tank according to claim 1, wherein
the compressed gas storage tank has an outlet device, in particular comprising an air inlet, through which products of the oxidation reaction of the fuel can be discharged into the environment of the compressed gas storage tank, and/or which is designed as a section of an exhaust gas tract of the motor vehicle.

16. The compressed gas storage tank according to claim 15, the outlet device, in particular tapering towards an outlet, is aligned essentially vertically in the installation position of the compressed gas storage tank and/or has a cover at the end, and/or the catalytic converter device is arranged in a section of the outlet device, in particular having a sonic vaporizer.

17. The compressed gas storage tank according to claim 16, the air inlet comprises a non-return valve and/or valve device with a flow resistance which is lower in a first flow direction than in a second flow direction opposite to the first flow direction.

18. The compressed gas storage tank according to claim 15, the air inlet comprises a non-return valve and/or valve device with a flow resistance which is lower in a first flow direction than in a second flow direction opposite to the first flow direction.

19. The compressed gas storage tank according to claim 1, wherein
at least one electrode of the at least one piezoelectric element has a coating with a catalyst material which is designed to catalyze an oxidation reaction of the fuel originating from the holder with oxygen and/or the compressed gas storage tank has at least two piezoelectric elements to which the pressure can be applied.

20. A method for operating a compressed gas storage tank, in particular for a motor vehicle, in which a compressed fuel is stored in a holder of the compressed gas storage tank, and in which, due to an opening of at least one pressure relief valve of the compressed gas storage tank, fuel is discharged from the holder into an environment of the compressed gas storage tank, wherein an oxidation reaction is catalyzed by means of a catalytic converter device of the compressed gas storage tank, in which oxidation reaction fuel originating from the holder reacts with oxygen,
wherein
the compressed gas storage tank comprises at least one piezoelectric element which is pressurized by the opening of the at least one pressure relief valve, wherein at least one spark is generated by the at least one piezoelectric element due to the application of the pressure to the at least one piezoelectric element.

* * * * *